(No Model.) 2 Sheets—Sheet 1.

E. D. MIDDLEKAUFF.
ICE CREAM FREEZER.

No. 458,119. Patented Aug. 18, 1891.

Witnesses.
O. E. Van Doren
O. E. Hawley

Inventor.
Ellsworth D. Middlekauff
By Paul & Merwin Attys (No Model.)  2 Sheets—Sheet 2.
E. D. MIDDLEKAUFF.
ICE CREAM FREEZER.
No. 458,119.  Patented Aug. 18, 1891.
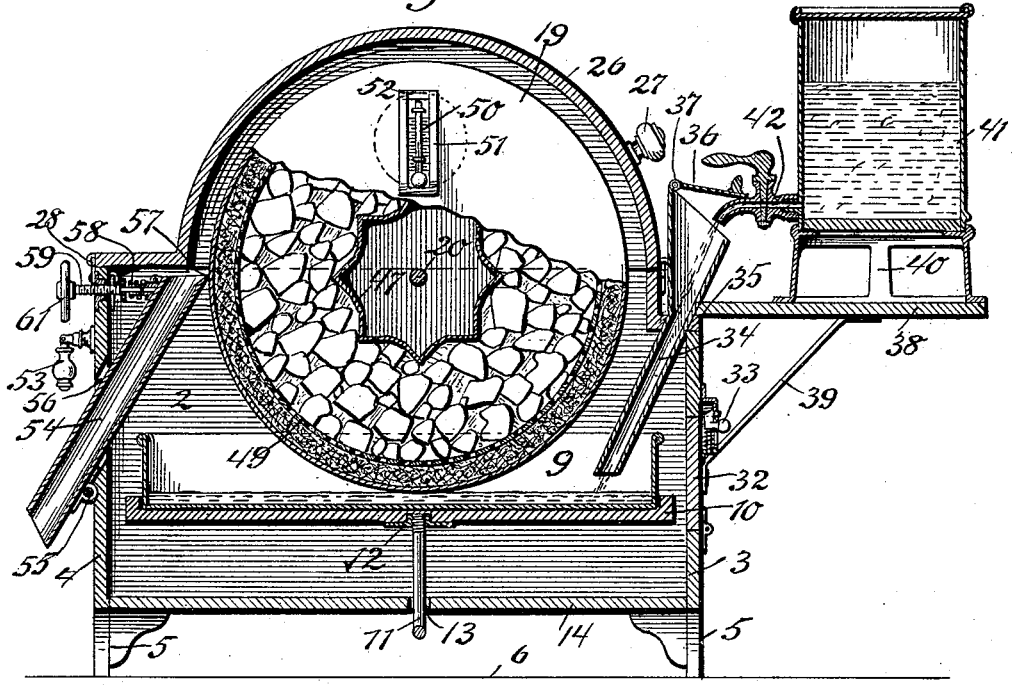
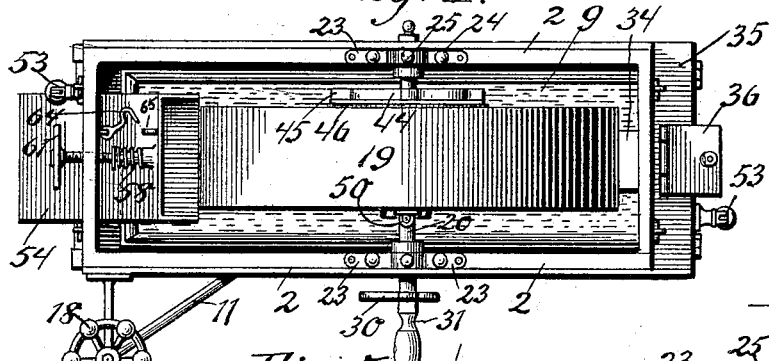
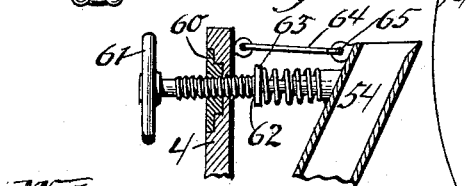
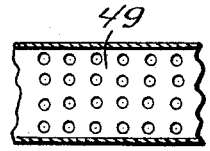
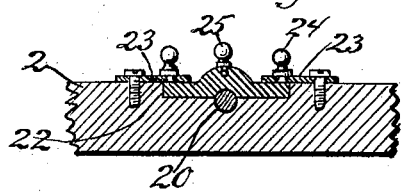
Witnesses.
O. E. Van Doren.
O. G. Hawley.
Inventor.
Ellsworth D. Middlekauff.
By Paul & Merwin Atty's

UNITED STATES PATENT OFFICE.

ELLSWORTH D. MIDDLEKAUFF, OF MINNEAPOLIS, MINNESOTA.

ICE-CREAM FREEZER.

SPECIFICATION forming part of Letters Patent No. 458,119, dated August 18, 1891.

Application filed May 15, 1891. Serial No. 392,804. (No model.)

*To all whom it may concern:*

Be it known that I, ELLSWORTH D. MIDDLE-KAUFF, of Minneapolis, in the county of Hennepin and State of Minnesota, have invented certain Improvements in Ice-Cream Freezers, of which the following is a specification.

My invention relates to ice-cream freezers, and especially to a device adapted to instantly and continuously freeze a small quantity of cream or other liquid.

The invention relates, further, to a specially-constructed freezer having a drum adapted to revolve on a horizontal shaft, and whereby the device is rendered convenient and easy to operate.

The object of the invention is to provide a device of the class described adapted to hold the cream and to freeze the same when wanted, and to provide a machine both economical in manufacture and in use.

The invention consists in the combination, with a drum adapted to receive the freezing substance or mixture and to revolve on a substantially horizontal axis, of an adjustable liquid-holder provided in connection therewith.

The invention consists, further, in means for evenly distributing the freezing-mixture to the periphery of the freezing-drum; and, further, the invention consists in various constructions and combinations hereinafter described, and particularly pointed out in the claims.

My invention will be more readily understood by reference to the accompanying drawings, in which—

Figure 1:
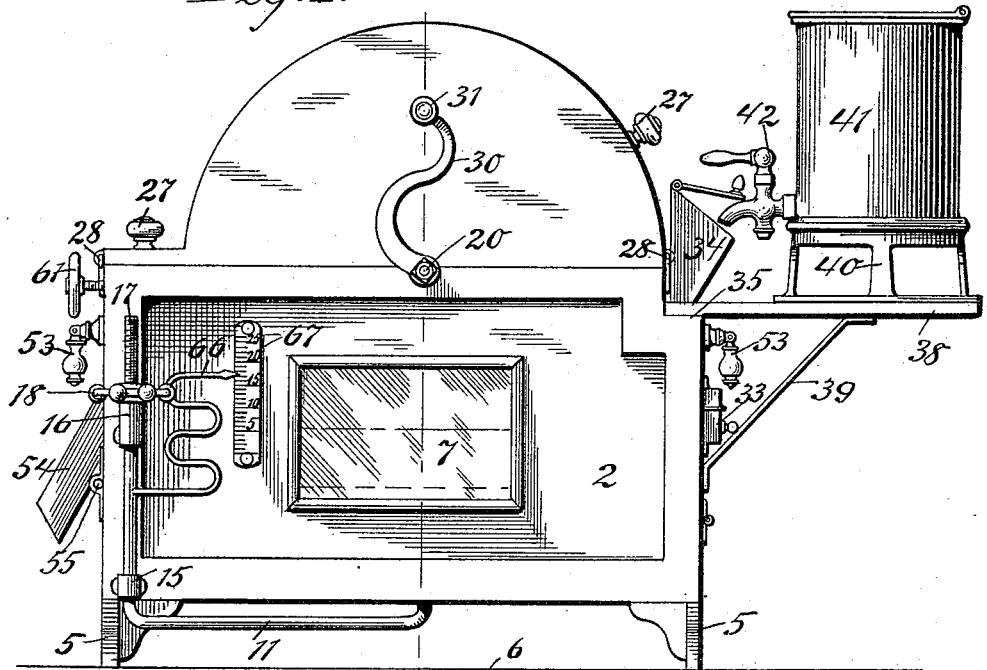
Figure 2:
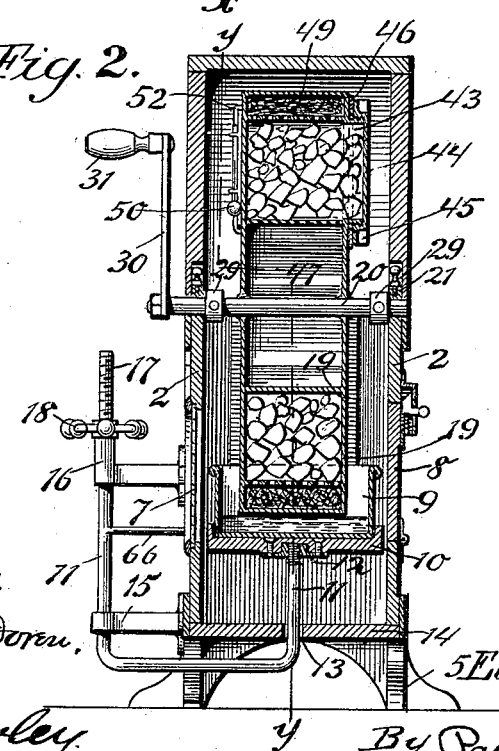

Figure 1 is a side view of a liquid-freezer embodying my invention. Fig. 2 is a vertical cross-section of the same on the line $x\ x$ of Fig. 1. Fig. 3 is a transverse vertical section on the line $y\ y$ of Fig. 2. Fig. 4 is a plan view of a machine showing the interior thereof, the top being removed. Fig. 5 is a detail showing the means of adjusting the scraper with respect to the drum. Fig. 6 is a sectional detail showing one of the removable bearings or fastenings for the drum-shaft. Fig. 7 shows a section of the perforated inner lining of the drum.

As shown in the drawings, the principal parts of the device are inclosed in a neat paneled case having sides 2 and ends 3 and 4 and standing upon suitable legs 5, raising the box somewhat above the surface 6. One side of the box or case is provided with the small window 7 and the opposite side with a small door 8 for allowing access to the cream-pan 9, adapted to rest on the horizontal table 10, adjustably supported in the bottom of the case or box by the stem or rod 11, secured to the board by the casting 12 and extending down through the hole 13 in the bottom 14 of the box. The rod is thence bent and carried diagonally across under the box and through the loop or eye brackets 15 and 16, in which the other vertical end of the rod 11 is held securely. The upper end 17 of the rod is threaded, as shown, and is secured in the bracket 16 by the adjusting-wheel 18, having a thread corresponding to the thread 17 and loosely resting on the top of the bracket 16. By turning the wheel 18 it will be seen that the board or table 10 and the liquid-pan may be moved up or down on the bottom of the freezer-box and with respect to the freezer-drum 19. This drum 19 is secured on the horizontal shaft 20, having bearings in the upper edges of the sides 2, and secured thereon by the removable top boxes or fastenings 21, adapted to set into notches 22 in the side boards 2, and secured therein by the turn-buttons 23, having hand-knobs 24. Each box or fastening is also provided with a knob 25, whereby the same may be conveniently lifted off after the buttons are disengaged. The circular top 26 is adapted to rest on the upper edges of the box or case, and is provided with knobs or handles 27, by means of which it may be lifted off after the hooks 28 at the ends of the case are unfastened. The shaft 20 is held against longitudinal movement by the adjustable collars or shoulders 29, and is provided with the crank 30, having the handle 31. A small door 32, having a catch 33, is provided in the end 3 of the box, through which the pan may be taken out.

The cream is poured into the pan 9 through the rectangular funnel or spout 34, arranged in an opening in the horizontal shoulder 35 provided therefor in the upper part of the box. The upper end of the funnel is closed by the cover 36, hinged on the upper edge 37 thereof. The shelf 38 is secured on the end of the case by brackets 39 and upon the shoulder 35, and is provided with a stand 40 for the cream can or jar 41, having the faucet 42, by which the cream is discharged into the funnel or spout 34. By this means the cream may be continuously fed into the pan 9 while the drum is being revolved to freeze and carry the same out of the pan, thereby keeping the cream at just the required level in the pan 9 and avoiding wastage by the accumulation of frozen cream on the vertical sides of the drum. The drum 19 is provided with the opening 43 in the side thereof and covered by the screw-cap 44, having projections or lugs 45, whereby the same may be driven tightly against the gasket 46, provided between the flange of the cap and the drum and making an air-tight joint therewith. The ice, salt, &c., or other freezing-mixture, are inserted in the drum through this opening.

I provide a second drum 47 within the drum 19 and around the shaft 20, whereby the ice or freezing-mixture is confined more closely to the periphery or outside of the drum. This inner drum 47 is of considerable size and is preferably corrugated, as shown, to better hold the ice in place and prevent sudden shifting of the same. In addition to this drum 47, I may also arrange the layer of felt or other porous material in contact with the inner periphery of the drum and held in place by the perforated collar or sleeve 49, a section of which is shown in Fig. 7. This felt becomes saturated with the freezing-mixture and more evenly distributes the same to the inner surface of the drum or cylinder. This felt, however, may, if desired, be dispensed with, as the device will work well without it.

I provide a thermometer 50 in the slide 51, arranged on the side of the drum. The thermometer is provided on the usual plate and is confined in the slide by turning down the ends 52 thereof. One thermometer may be substituted for the other by simply turning up these ends. Handles 53 are arranged on the box for more convenient handling of the same. As the cylinder is revolved, with its lower portion dipping into the liquid in the pan 9, the liquid is taken up thereby and instantly congealed on the face of the drum. This thin layer of frozen material or liquid is removed from the drum and discharged into a suitable receptacle by the combined scraper and spout 54, pivoted by the bar 55 to the end 4 of the box and extending through the opening or slot 56 therein. This scraper is provided with the sharp edge 57, adapted to rest against the cylinder or drum about on a line with the axis of the same and held firmly against the drum by the coiled spring 58. (Shown most clearly in Fig. 5.) The tension of this spring may be adjusted by means of the screw-stud 59, passing through the threaded collar 60, secured in the end 4 and having the hand-wheel 61. The shoulder 62 of the stud acts against the washer 63, and the other end of the spring rests against the shoulder on the spout 54. I provide the hook 64, adapted to be secured in the eye 65 on the spout and to hold the scraper away from the drum.

In use the pan is filled with cream and adjusted with respect to the drum, so that the drum will just dip into the surface of the liquid. As the liquid is exhausted from the pan the wheel 18 is turned gradually so as to raise the end 17, and therewith the pan 9. If after turning out the desired quantity of ice-cream or other frozen article a certain portion of the liquid remains in the pan, the pan may be dropped so that the drum will no longer come in contact with the liquid and the machine may be left to stand for a considerable length of time, until more ice-cream is needed, at which time, by raising the pan, the cream may be immediately frozen. If the cylinder were allowed to remain standing in the liquid the same would become frozen so tight in the liquid as to render the turning of the drum impossible.

I provide a pointer 66, in connection with the rod 11, and on the side of the case arrange the scale 67, having indicating-points whereby the position of the adjustable pan is clearly indicated to the user.

Having thus described my invention, I claim as new and desire to secure by Letters Patent—

1. The combination, in a device of the class described, of the refrigerant cylinder 19, with the perforated sleeve 49, and the porous material 48, arranged between the same and the cylindrical walls of the drum or cylinder, substantially as described.

2. The combination, in a device of the class described, of the cylinder 19, having the inner cylinders 47 and 49, with the porous material 48, said cylinder 49 being perforated, and a liquid-pan arranged beneath said cylinder or drum 19, substantially as described.

In testimony whereof I have hereunto set my hand this 11th day of May, 1891.

ELLSWORTH D. MIDDLEKAUFF.

In presence of—
 O. G. HAWLEY,
 FRED S. LYON.